Sept. 8, 1970 V. D. HUMM 3,527,454

REPAIR FIXTURE

Filed Nov. 15, 1967

INVENTOR.
Vic D. Humm

BY
Barnard, McGlynn & Reising
ATTORNEYS

United States Patent Office 3,527,454
Patented Sept. 8, 1970

3,527,454
REPAIR FIXTURE
Vic D. Humm, 801 Plate St., Apt. A203,
Rochester, Mich. 48063
Filed Nov. 15, 1967, Ser. No. 683,402
Int. Cl. B25b *5/14;* B23k *37/04*
U.S. Cl. 269—45                                13 Claims

ABSTRACT OF THE DISCLOSURE

In a preferred form the present invention relates to fixturing apparatus especially adapted for the repair of eyeglasses whose frames have been fractured. The fixturing device herein described includes a movable master reference plate holding one portion of the eyeglasses supported on a vertical standard, said master reference plate being positioned relative to a second vertical standard supporting secondary reference means which are incrementally adjustable relative to said master reference means. In this manner, precise alignment along the fracture line of a set of eyeglasses can be achieved for repair purposes.

---

The present invention relates to fixturing apparatus and, more particularly, to a repair fixture which is adapted to hold a broken pair of eyeglasses in perfect alignment along the fracture line for repairing the frames thereof.

Eyeglasses having a particular lens arrangement adapted to correct a visual defect in one or both eyes of a person are a personal thing that are generally prescribed by an optometrist and are specially made by an optician. Normally the optometrist and the optician maintain records showing the exact geometrical construction of the lens suited for a particular person. Eyeglasses commonly in use today have plastic frames that support corrective lenses in an appropriate manner relative to the physical construction of a person's anatomy. It is often necessary to adjust the eyeglasses prescribed for a particular person after they have been received by that person in order to insure the most comfortable and dimensionally accurate positioning of the lenses relative to the eyes.

It is obvious that often inadvertently a person breaks the plastic support of eyeglasses holding the lenses in the proper spatial relation to one another and repair is necessitated. If the person is physically located near the optometrist or optician that originally provided the glasses, a certain amount of delay is necessitated during which time the person must be inactive in many cases. A more serious problem arises when a person who has been fitted to a particular set of eyeglasses is in a remote place relative to the optometrist or optician that originally provided him with the eyeglasses. In these cases a local optometrist or optician can be consulted but with considerable expense and delay to the person involved in order to refit the glasses. Consequently, it has been found to be much more economical and expedient to repair the glasses under these circumstances.

Another situation in which a person can be caused a problem is that in which prescription safety glasses have been fitted to an individual in a plant, for example. With a broken set of eyeglasses, it is necessary that the person be inactive and off the job during the time that repairs are effected. This is extremely uneconomical and inconvenient to both the person and the employer. Consequently, it is important that a very easy, rapid and accurate method or means be provided for the repair of eyeglasses in the aforementioned situations.

This invention relates to a fixturing device which is adapted to hold one portion of a broken eyeless frame with a lens still positioned within the broken frame with means provided for incrementally and very accurately positioning the other broken eyeglass piece to the first for repair purposes. The only accurate positioning of one broken piece to the other is had when the two broken pieces are positioned exactly along the fracture line of the break. Although plastic eyeglass lens holders are in common use, it is also efficient and practical to employ the subject invention to repair metal eyeglass lens holders. The fixturing apparatus which is the subject of the present invention is of the type that can be maintained in the working shop of a jeweler or an optician and repairs can be effected to the glasses without consulting the optometrist with complete integrity of the original prescribed lens relationship maintained.

The prior art teaches many types of fixturing devices for the repair of eyeglasses and other apparatus which is adapted to hold broken pieces of a composite object in fixed, spatial relationship for repair purposes. However, all of the aforementioned fixturing devices have proved inadequate because they generally involve very simple nonstable holding devices or involve ball and socket arrangements in order to gain the necessary universal movement of one holding member relative to another to achieve the precise alignment of the broken pieces. Ball and socket arrangements are notoriously unstable and, of course, are not adapted for incremental adjustment so that the most precise kind of alignment can be obtained, which is a necessary requisite to the repair of eyeglasses. Consequently, the devices of the prior art have not found wide usage.

It is an object of the present invention to provide an improved fixturing device which is particularly adapted to hold two broken pieces of a composite object in precisely the proper spatial relationship necessary to the repair thereof in a most accurate manner.

It is another object of the present invention to provide an improved fixturing apparatus that is adapted to hold, in a desired fixed spaced relationship, delicate articles such as pieces of glass held in frames that will enable the accurate repair thereof.

It is still another object of the present invention to provide improved fixturing apparatus that includes two vertically positioned standards held on a common base member utilizing a master reference plate and a universally adjustable secondary reference plate for incremental movement of the secondary reference plate relative to the master reference plate to achieve an exact and precise spatial relationship between the two.

It is a further object of the present invention to provide improved fixturing apparatus that can be manufactured to extremely fine tolerances while being completely adjustable and which is capable of being manufactured by any qualified tool and die maker in an expedient and economical manner.

Further objects and advantages of the present invention will be apparent from the following description, reference being had to the accompanying drawings wherein a preferred embodiment of the present invention is clearly shown.

Figure 1:
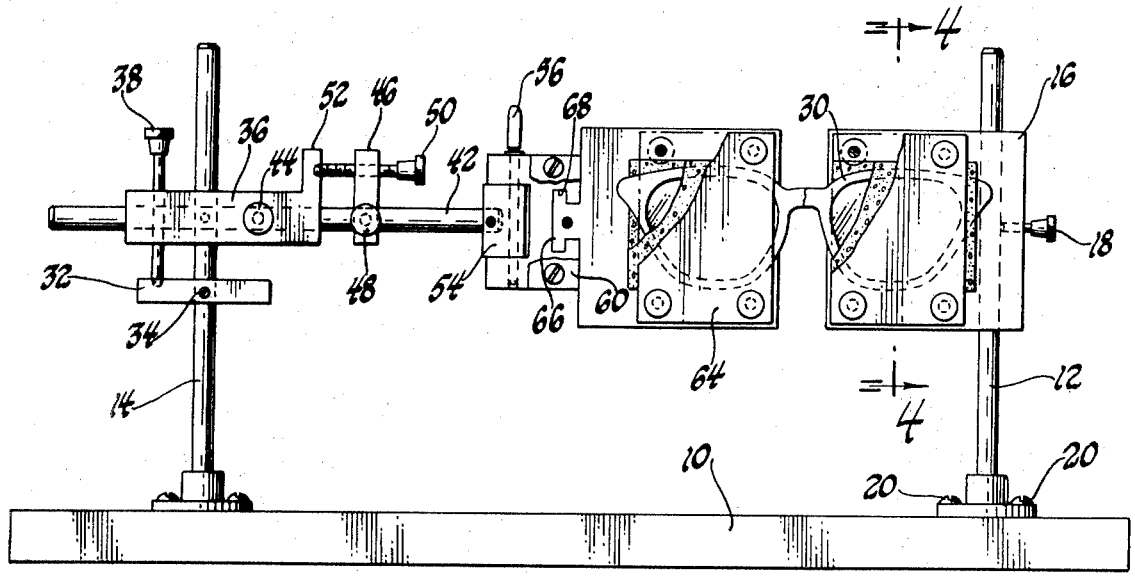
FIG. 1 is a side elevation of the present invention with the apparatus illustrated as holding a broken pair of eyeglasses.

Referring to the drawings and more particularly to

FIG. 1, a base member 10 is shown as supporting a first vertical reference standard or support 12 and a second vertical reference standard or support 14 in a fixed manner. Master reference plate 16 has an aperture therethrough that adapts it to slide along the longitudinal axis of the first vertical reference standard 12 and is held in any desired position by lock screw 18. The first vertical reference standard 12 is maintained in position on base member 10 by any common means such as by screws 20.

Figure 2:
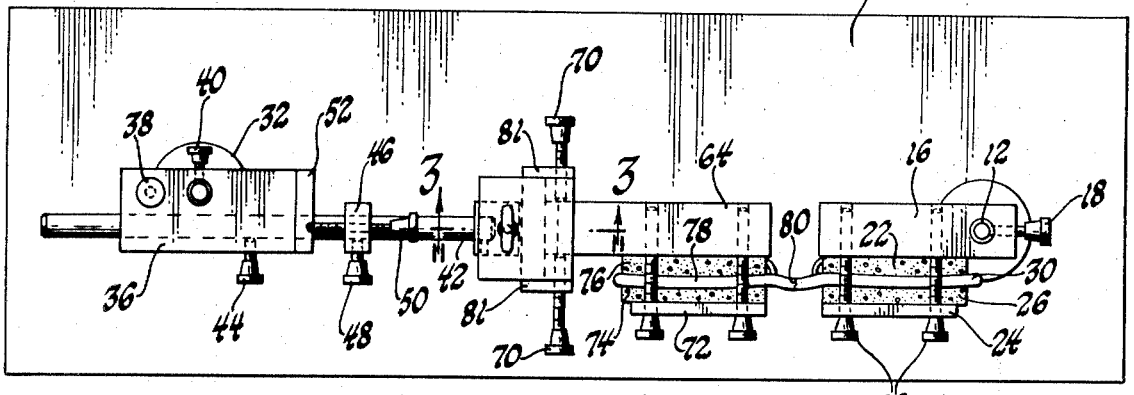
FIG. 2 is a plan view of the apparatus shown in FIG. 1.

Referring to FIG. 2, another view of the master reference plate 16 is seen in which plate 16 is shown as having a resilient non-abrasive material 22 affixed thereto in any well known manner such as by bonding. Oppositely positioned from plate 16 is a clamping plate 24 and together these plates are sometimes referred to herein as first clamping or holding means, plate 24 carrying resilient non-abrasive material 26 in the same manner as plate 16. Holding screws 28 pass through plate 24 and threadedly engage plate 16 so that turning the screws 28 squeezes the resilient material on either side of an object; for example, eyeglass frame 30 positioned therebetween.

Referring to FIG. 1, second vertical reference standard 14 is identical to the first vertical reference standard 12 and is attached to base member 10 in a similar fashion. Fixed abutment of plate means 32 is carried by or is maintained in fixed relationship to second vertical reference standard 14 in any well known manner; for example, by screw 34. An auxiliary reference plate 36 has an aperture therein adapting it to slide translationally on second vertical reference standard 14 in any area above fixed plate 32. Incremental adjustment of the auxiliary reference plate 36 relative to fixed plate 32 can be effected through vertical adjustment screw 38 threadingly engaging plate 36 and acting against fixed plate 32. Referring to FIG. 2 it is seen how vertical adjusting screw 38 co-operates with reference plate 36 and that reference plate 36 has sufficient area thereon to allow approximately 180° of movement of reference plate 36 around the longitudinal axis of the second vertical reference standard 14. In addition, lock screw 40 enables auxiliary reference plate 36 to be locked in an adjusted position to preclude further relative movement between plate 36 and the second vertical reference standard 14 after a desired elevation thereof has been assumed.

Referring to FIG. 2, an extension bar 42 is slidable in an aperture in auxiliary reference plate 36 as also seen in FIG. 1. Lock screw 44 is carried by auxiliary reference plate 36 in interference with extension 42 so that an adjusted position thereof, relative to auxiliary reference plate 36, can be locked in. Referring to FIG. 1, horizontal adjustment plate 46 is locked in its relationship to extension 42 by lock screw 48. This sets up a rough relationship between the objects being fixtured. Horizontal adjustment screw 50 is threadingly engaged by horizontal adjusting plate 46 and acts against upstanding portion 52 of auxiliary reference plate 36.

Figure 3:
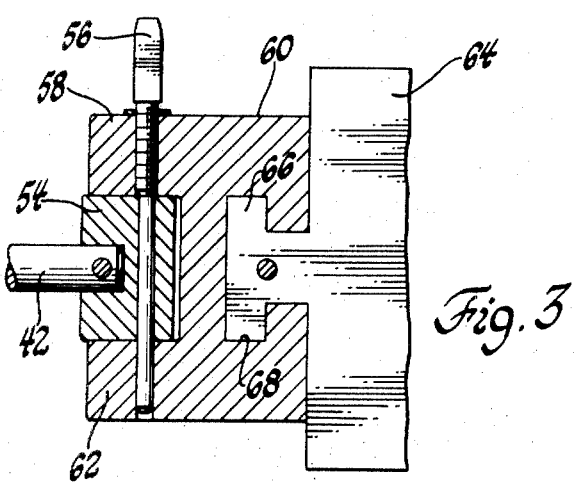
FIG. 3 is a sectional view of the subject invention shown along line 3—3 of FIG. 2.

Extension 42 carries member 54 on one end thereof that has an aperture therethrough adapted to receive lateral position lock screw 56. Referring to FIG. 3, lock screw 56 is seen as threadingly engaging portion 58 of bracket 60. Portions 58 and portion 62 of bracket 60 fit on either side of member 54 so that when lateral position lock screw 56 is loosened, free pivotal movement is possible between bracket 60 and member 54 on the longitudinal axis of screw 56. When screw 56 is threaded completely through portion 58 and engages the top surface of member 54, member 54 is forced against portion 62 preventing further pivotal movement of bracket 60 around the shaft of lateral position lock screw 56.

Referring to FIG. 1, secondary reference plate 64 is similar to master reference plate 16 and is slidably carried for transverse movement relative to the longitudinal axis of extension 42. This sliding movement is controlled by the co-operation of key 66 with keyway 68 formed in bracket 60. Referring to FIG. 2, it is seen that lateral positioning screws 70 threadingly engage bracket 60 on either side of secondary reference plate 64 in order to control and lock plate 64 in any lateral position in keyway 68 relative to extension 42. Referring to FIG. 2 holding plate 72 is similar to holding plate 24 and has resilient non-abrasive material 74 held on one face thereof and similarly resilient material 76 is held in any well known manner to the opposing face of secondary reference plate 64. Between the pieces of resilient material a broken object, such as eyeglass frame portion 78, can be held. It is thus seen that alignment is possible between portion 78 and portion 30 of the eyeglass frame so that a fracture as seen by line 80 can be reset in much the same manner as a physician sets a bone.

In summary then, it is clear therefore that unique apparatus has been provided comprising: a first support 12 carrying a first holding means, plates 16 and 24, co-operating with a second holding means, plates 64 and 72, through a positioning means, screws 38, 50, 56 and 70 acting against relatively fixed plates respectively, all carried by a second support 14, to incrementally move the second holding means carrying an eyeglass frame broken part relative to a first holding means carrying a mating eyeglass frame broken part so that the two broken parts are aligned for repair purposes.

More specifically, the first holding or clamping means includes a master reference plate 16 that is movable to a position on the first reference means, support 12, to establish a reference position to which the remainder of the mechanism is later referenced. Second holding or clamping means is very similar to the aforementioned first clamping means but is not held on a fixed standard directly but rather through a series of intermediate adjustable means. An auxiliary reference means is slidably carried on the second standard and is very finitely adjustable therealong by a screw 38 acting against a fixed plate. This adjustment is primarily designed to accurately and incrementally approach and match the vertical elevation of the second holding means relative to the first holding means. This can be accomplished along any transverse axis along the longitudinal axis of the second standard or fixed means 14. By transverse is meant an axis perpendicular to the longitudinal axis of standard 14. This allows angular alignment of the second eyeglass holding means 64 and 72 relative to the first such means 16 and 24 already fixed on the first standard. This alignment is possible along any plane perpendicular to the second support 14 in the zone above the fixed plate 32.

A further incremental adjustment is made possible by extension bar 42 carrying plate 46 with screw 50 passing therethrough and acting against a portion 52 of auxiliary reference plate 36 through which the bar 42 passes. The extension bar 42 slides transversely of the longitudinal axis of the second support 14. This adjustment serves to bring clamping plates 64, 72 more into proximity with the clamping plates 16, 24.

The extension means above described also carries a relatively fixed member 54 on which bracket 60 of the secondary reference means 60, 64 and 72 pivots. Pivotal control is had by screw 56 passing through two legs of bracket 60 with member 54 interposed therebetween.

A final incremental adjustment means is had by the co-operation of a key portion 66 integrally formed with clamping plate 64 and keyway 68 formed in bracket 60. Plates 81 carried as a part of bracket 60 carry opposed screws 70 acting on either side of key portion 66 to incrementally adjust plate 64 relative to bracket 60 and consequently the second clamping means relative to the first clamping means. Collectively, the several incremental adjusting means hereinbefore described serve to exactly position one eyeglass frame in space relative to a mating broken piece so that repairs can be effected without changing an alignment between the two broken pieces established before the break took place.

Figure 4:
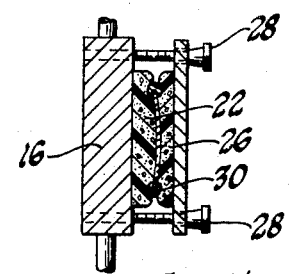
FIG. 4 is a sectional view taken along line 4—4 of FIG. 1.

In operation, the subject fixturing apparatus is operated by first inserting one piece of a broken object such as an eyeglass between the resilient material 22 and 26 carried by master reference plate 16 and holding plate 24. FIG. 4 illustrates the typical mounting of the eyeglass frame broken portion between the two plates.

Similarly, a second broken piece of an eyeglass frame is mounted between resilient materials 74 and 76 held by plate 72 and 64 respectively. Next, rough alignment between reference plate 64 and plate 16 can be achieved by loosening the lock screw 40 as seen in FIG. 2 and rotating auxiliary reference plate 36 around second vertical reference standard 14 so that plate 64 roughly approximates the in-line position of plate 16 and the fracture 80. As the approximate spatial relationship that is desired is established, lock screw 40 lightly engages vertical reference standard 14 and a further fine adjustment on the height is brought about by vertical adjustment screw 38. When the precise level is achieved, lock screw 40 is tightened so that the adjustment cannot later be casually disturbed.

Referring to FIG. 1, lock screw 48 is loosened and horizontal adjusting screw 50 is turned in horizontal plate 46 until the desired alignment at the fracture point is engendered. When the approximate alignment is achieved, lock screw 44 is tightened to prevent further movement of extension 42 relative to auxiliary reference plate 36. Lateral position lock screw 56 can be loosened so that plate 64 can be pivoted around the shaft of lock screw 56 until approximate end-to-end relationship of plate 64 is achieved relative to the master reference plate 16. This adjustment is locked in and incremental movement transversely of the longitudinal axis of either vertical reference standard 12 or 14 is achieved by movement of lateral positioning screws 70 as best seen in FIG. 2. Several later minor adjustments of vertical adjusting screw 38 or screw 50 or screw 56 may be necessary in order to bring the fracture into exact alignment. However, the artisan utilizing the fixturing apparatus will adapt the amount of adjustment necessary to the particular situation. It should be understood that the sequence of steps used in the foregoing example is illustrative alone and any other sequence, even skipping some of the steps, may be acceptable depending on the previously existing alignment.

It is obvious that the subject device has wider usage than merely as a device to hold broken eyeglass frames together in that any type of fractured article can be realigned in much the same manner as the eyeglass frames in order to gain a fixtured position from which repairs can be effectuated. It is likewise obvious that the subject fixturing apparatus can be used on a production basis where alignment is critical between two objects. Once a predetermined adjustment has been established lock screw 40 can be loosened; for example, to swing secondary reference plate 64 away from master reference plate 16 in order that the holding fixture may be reloaded and repositioned for further work. This would facilitate precision welding, soldering, or fusing of two parts having an unusual alignment problem.

While the embodiment of the present invention, as herein disclosed constitutes a preferred form, it is understood that other forms might be adopted.

The embodiments of the invention in which an exclusive property or privilege is claimed are defined as follows:

1. Fixturing apparatus for holding two pieces of a broken eyeglass assembly together in proper spatial relation during repair thereof, said apparatus comprising:
   first and second fixed means positioned in generally parallel alignment;
   first movable means including eyeglass holding means carried by said first fixed means and movable with respect thereto to a predetermined position;
   second movable means carried by said second fixed means and incrementally adjustable with respect thereto along any transverse axis along the longitudinal axis thereof;
   and adjusting means carried by said second fixed means including eyeglass holding means, said eyeglass holding means being thereby adapted for angular alignment with respect to the eyeglass holding means of said first movable means along any plane established from a selected point along a predetermined area of the longitudinal axis of said second fixed means so as to realign the broken eyeglass pieces, said second fixed means including plate means affixed to a portion thereof and said adjusting means being incrementally adjustably slidable on said second fixed means with respect to said plate means on one side thereof, said adjusting means further including an extension portion carried by said second movable means, said extension being slidably and incrementally adjustable transversely of the longitudinal axis of said second fixed means, said extension portion in turn carrying a pivotable portion incrementally movable transversely of the longitudinal axis of said extension and also pivotable in an arcuate path with respect to the longitudinal axis of said extension portion.

2. Fixturing apparatus for spatially relating broken elements of an eyeglass assembly for repair purposes, said apparatus comprising:
   a base member;
   first and second standards projecting perpendicularly in substantial parallelism from said base member;
   master reference means including clamping means adapted to carry a first broken element of an eyeglass and slidable on said first standard to a desired reference position;
   fixed abutment means carried by said second standard;
   auxiliary reference means pivotally carried by said second standard and incrementally adjustable thereon relative to said fixed abutment means;
   extension means carried by said auxiliary reference means, said extension means having means for incrementally varying the position of said extension means along any transverse axis relative to the longitudinal axis of said second standard;
   and secondary reference means carried by said extension means, being pivotally and incrementally slidably adjustable relative to said extension means and including clamping means for carrying a second broken element of an eyeglass, said secondary reference means being spatially positionable relative to said master reference means so that said second broken element of an eyeglass is precisely aligned with said first broken element of an eyeglass to facilitate repair and reintegration of the two broken elements into an aligned integral eyeglass assembly.

3. Fixturing apparatus according to claim 2 wherein the clamping means of said master reference means and the clamping means of said secondary reference means are opposed adjustable plate members having non-abrasive resilient means carried thereon to contact the glass and frame portion of an eyeglass maintaining an alignment thereof during repair.

4. Fixturing apparatus according to claim 2 wherein said secondary reference means is pivotally adjustable in an arcuate path transversely of the longitudinal axis of said extension means, said secondary reference means also having portions interconnected through a key and keyway being adapted for incremental translational movement in said keyway for fine adjustment of the position in space of said clamping means of the secondary reference means relative to said clamping means of the master reference means.

5. Fixturing apparatus according to claim 2 wherein said extension means includes means for incrementally varying its position along its own longitudinal axis relative to said auxiliary reference means.

6. Apparatus for holding broken pieces of an eyeglass frame in exact orientation to one another to effect repair thereof, said apparatus comprising:
- a base member;
- a first vertical reference standard carried by said base member in perpendicularity thereto;
- a master reference plate carried for rotation and sliding movement on said first vertical reference standard, said master reference plate including first clamping means adapted to hold one part of a broken eyeglass frame with a lens therein in a predetermined selected position;
- a second vertical reference standard carried by said base member in spaced parallel relationship to said first vertical reference standard, said second vertical reference standard including a fixed plate carried in spaced parallel relationship to said base member;
- an auxiliary reference plate pivotally and slidably carried by said second vertical reference standard and including means for incrementally adjusting said auxiliary reference plate relative to said fixed plate;
- extension means slidably carried by said auxiliary reference plate and including means acting against said auxiliary reference plate for incrementally varying the position of said extension means relative to said second vertical reference standard;
- and secondary reference means pivotally and slidably carried by said extension means, siad secondary reference means including second clamping means adapted to hold a second part of a broken eyeglass frame and lens therein as a combination of movements of said extension means and said secondary reference means gradually and incrementally moves said second clamping means into an exact spatial relation to said first clamping means so the two broken parts of the eyeglass frame are aligned along a fracture line for facilitating rejoining the two broken parts.

7. Apparatus according to claim 6 wherein said first and second clamping means are opposed plates having non-abrasive resilient material on opposed faces thereof for contacting the eyeglass frames and lenses, said plates being connected by spaced screw members for selectively applying pressure on either side of eyeglass frames and lenses for holding at a desired angle during repair thereof.

8. Apparatus according to claim 6 wherein said secondary reference means includes a bracket pivotable on a portion of said extension means, said second clamping means being slidably carried by said bracket through a keyway formed in said bracket, said second clamping means having a co-operating key portion integrally formed therein, and screw means carried by said bracket and engaging said second clamping means on opposite sides to incrementally position said second clamping means in said keyway.

9. Fixturing apparatus for holding elements and orienting the elements relative to one another, said apparatus comprising: a base; first and second spaced pairs of clamping members; means supporting said first pair of clamping members; means supporting said first pair of clamping members on said base for movement along a first axis; and positioning means operatively interconnecting said base and said second pair of clamping members for independently moving said second pair of clamping members along anyone of second, third and fourth axes and arcuately about a fifth axis which is transverse to at least one of said second, third and fourth axes, each of said second, third and fourth axes being perpendicular to the other two with one of said second, third and fourth axes being disposed generally in the direction along which said first and second pairs of clamping members are spaced, said first and second axes being spaced and parallel to one another and to said fifth axis.

10. An apparatus as set forth in claim 9 wherein said positioning means includes: a vertical standard supported on said base, and adjusting means operatively connected to said standard and supporting said second pair of clamping members for adjusting the latter along the vertical axis of said standard, said vertical axis being said second axis.

11. An apparatus as set forth in claim 10 wherein said positioning means further includes extension means operatively connected to said adjusting means and supporting said second pair of clamping members for varying the position of the latter along a horizontal axis, said horizontal axis being said third axis along which said pairs of clamping members are spaced.

12. An apparatus as set forth in claim 11 wherein said positioning means further includes secondary reference means operatively connected to said extension means and supporting said second pair of clamping members for varying the position of the latter along said fourth axis which is a horizontal axis.

13. An apparatus as set forth in claim 11 wherein said positioning means further includes secondary reference means operatively connected to said extension means and supporting said second pair of clamping members for varying the position of the latter along said fourth axis which is a horizontal axis and for rotation about said fifth axis, said fifth axis being perpendicular to said third axis.

References Cited
UNITED STATES PATENTS

| | | | |
|---|---|---|---|
| 1,670,253 | 5/1928 | Gilbert et al. | 269—45 |
| 2,669,958 | 2/1954 | Sweeney | 269—45 |

LESTER M. SWINGLE, Primary Examiner

D. D. EVENSON, Assistant Examiner